US009133960B2

(12) United States Patent
Lucas et al.

(10) Patent No.: US 9,133,960 B2
(45) Date of Patent: Sep. 15, 2015

(54) FLUID CONTROL VALVES (71) Applicant: MKS Instruments, Inc., Andover, MA (US)

(72) Inventors: Paul D. Lucas, Melrose, MA (US); Gordon Hill, Arlington, MA (US); Jaroslaw Wojciech Pisera, Boulder, CO (US)

(73) Assignee: MKS Instruments, Inc., Andover, MA (US)

( * ) Notice: Subject to any disclaimer, the term of this patent is extended or adjusted under 35 U.S.C. 154(b) by 185 days.

(21) Appl. No.: 13/753,019

(22) Filed: Jan. 29, 2013

(65) Prior Publication Data

US 2014/0209181 A1 Jul. 31, 2014

(51) Int. Cl.
 F16K 3/36 (2006.01)
 F16K 49/00 (2006.01)
(52) U.S. Cl.
 CPC ........... *F16K 49/00* (2013.01); *Y10T 137/0419* (2015.04); *Y10T 137/6416* (2015.04)
(58) Field of Classification Search
 CPC ......... F16K 49/00; F16K 25/02; F16K 29/00; F16K 29/02; F16K 1/222; Y10T 137/6416; Y10T 137/0419
 USPC .......... 251/305, 314, 359; 137/240, 301, 238, 137/334, 15.01
 See application file for complete search history.

(56) References Cited

U.S. PATENT DOCUMENTS

| | | | |
|---|---|---|---|
| 4,003,394 A * | 1/1977 | Adams | 137/15.06 |
| 4,063,709 A | 12/1977 | Lorthiois | |
| 4,140,147 A * | 2/1979 | Van't Sant | 137/240 |
| 4,164,236 A * | 8/1979 | Owen et al. | 137/240 |
| 4,632,360 A | 12/1986 | Desalve | |
| 4,658,853 A * | 4/1987 | Pennington | 137/240 |
| 5,462,080 A | 10/1995 | Plavidal et al. | |

(Continued)

FOREIGN PATENT DOCUMENTS

JP 11-013597 1/1999

OTHER PUBLICATIONS

Machine Translation of JPH1113897 from EPO website Sep. 2014.*

(Continued)

*Primary Examiner* — Jessica Cahill
(74) *Attorney, Agent, or Firm* — McDermott Will & Emery LLP (57) ABSTRACT A valve assembly comprises: a valve body including a passageway through which a first gas can be transmitted through the valve assembly; a valve flow control element movable relative to the valve body between an opened position wherein flow through the passageway is at a maximum flow, and a closed position wherein flow through the passageway is at a minimum flow, the valve flow control element is shaped so that a control gap is provided between the valve body and valve flow control element through which the first gas can flow, and the dimensions of the control gap vary depending on the position of the valve flow control element relative to the valve body; and a gas injector arrangement for selectively injecting a second gas into the control gap when the valve assembly is used to control the flow of the first gas through the passageway. The injection of the second gas when the valve flow control element is at or near its closed position helps minimize condensate being deposited on the valve flow control element, as well as reduce the closed conductance of the valve.

19 Claims, 12 Drawing Sheets

(56) References Cited

U.S. PATENT DOCUMENTS

| | | | |
|---|---|---|---|
| 5,485,542 A | 1/1996 | Ericson | |
| 5,564,679 A | 10/1996 | Ericson et al. | |
| 5,642,751 A * | 7/1997 | Crawley | 137/340 |
| 5,827,370 A | 10/1998 | Gu | |
| 6,089,537 A | 7/2000 | Olmsted | |
| 6,090,206 A | 7/2000 | Bang et al. | |
| 6,439,255 B1 | 8/2002 | Chamberlain | |
| 6,776,394 B2 | 8/2004 | Lucas | |
| 6,907,892 B2 * | 6/2005 | Sugano | 134/94.1 |
| 7,681,590 B2 * | 3/2010 | Lo | 137/613 |
| 2002/0185067 A1 | 12/2002 | Upham | |
| 2005/0067603 A1 * | 3/2005 | Lucas et al. | 251/326 |
| 2005/0252551 A1 * | 11/2005 | DeCourcy et al. | 137/240 |
| 2011/0101259 A1 * | 5/2011 | Pisera et al. | 251/305 |
| 2012/0227818 A1 * | 9/2012 | Steele | 137/1 |

OTHER PUBLICATIONS

International Search Report and the Written Opinion dated May 12, 2014 from Corresponding PCT Application No. PCT/US2014/011953.

* cited by examiner

FLUID CONTROL VALVES

FIELD

This application relates generally to control valves for regulating fluid flow through a conduit, and more particularly to valves configured to allow in-situ cleaning of the valves while in use, so as to enable any gap between the valve flow control element and the valve body, and its immediate surrounds, to (a) remain clean of condensate and (b) be maintained at an elevated temperature to prevent condensation along wetted surfaces of the valve flow control element.

BACKGROUND

When used, the term "gas" shall refer to both "gas" and "vapor" in the event the terms are considered to be different.

Control valves are well-known in the art as a means for regulating the rate of flow of a gas through a conduit. One type of control valve is a "flapper" valve (also sometimes referred to as a "throttle" or "butterfly" valve) in which a "flapper" or plate-like valve flow control element is disposed inside a fluid passageway and centrally or close to centrally mounted on a rotatable shaft passing laterally through the interior of the passageway. The orientation of the plane of the flapper is typically adjustable by rotating the shaft in a clockwise and/or counterclockwise direction. The flapper is precisely dimensioned so as to close and more or less seal the passageway to stop or at least substantially reduce fluid flow to a minimum flow when the plane of the flapper is oriented to block the flow of gas, at a 0° position. Alternatively, rotating the shaft and the flapper between 0° and 90° or so, such that the plane of the flapper moves from a fully closed position to a fully opened position, results in the ability to control the flow rate of gas through the passageway by controlling the position of the flapper between some minimum or zero flow to a maximum flow. The simplicity and ease of operation of such flapper valves makes them particularly well suited to regulating the flow of gases in a control system that requires delivery of gases in precise amounts.

Another type of valve useful in regulating gas flow is the pendulum or gate valve. A pendulum or gate valve assembly generally includes a housing containing a pendulum or gate valve flow control element, an interior space and a pair of openings through which gas can enter and exit the interior space.

As its name implies, the valve flow control element (usually referred to as a "gate") is moveable between fully opened and fully closed positions. The valve flow control element, usually in the form of a disk, is connected to a rotatable shaft by a pivot arm. In a completely opened position the disk of the pendulum valve is typically positioned outside of the flow path defined by the openings so that fluid can enter and exit the interior space of the housing. In a completely closed position the disk is moved into sealing contact with a valve seat surrounding one of the openings so that fluid can not pass through the valve.

The movement of the gate usually requires rotational (i.e., pivotal or lateral) movement between the completely opened position and an intermediate position, and then at least some longitudinal (i.e., translational, linear or axial) movement from the intermediate position to the completely closed position where the gate disk is in sealing contact with the valve seat. In order to obtain this combination of rotational and translational movement, pendulum valves typically use some type of rotation-axial translational mechanism to move the valve body in the desired directions as it moves through its entire range of motion.

Figure 1:
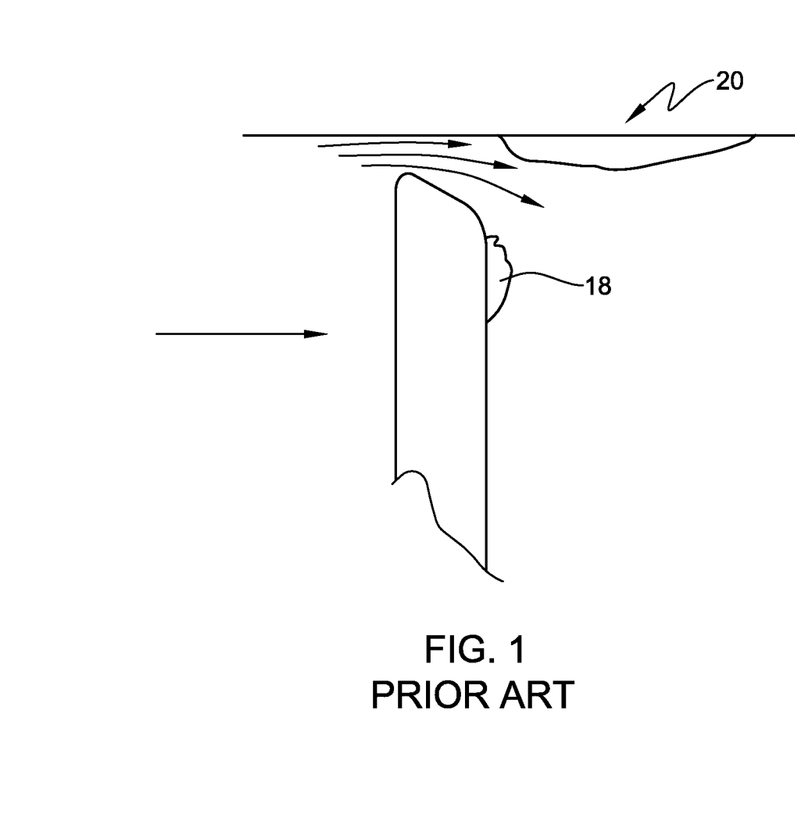
FIGS. 1 and 2 are simplified side views of a throttle valve, partially cut away, intended to illustrate one problem addressed by the implementations described herein.
Figure 2:
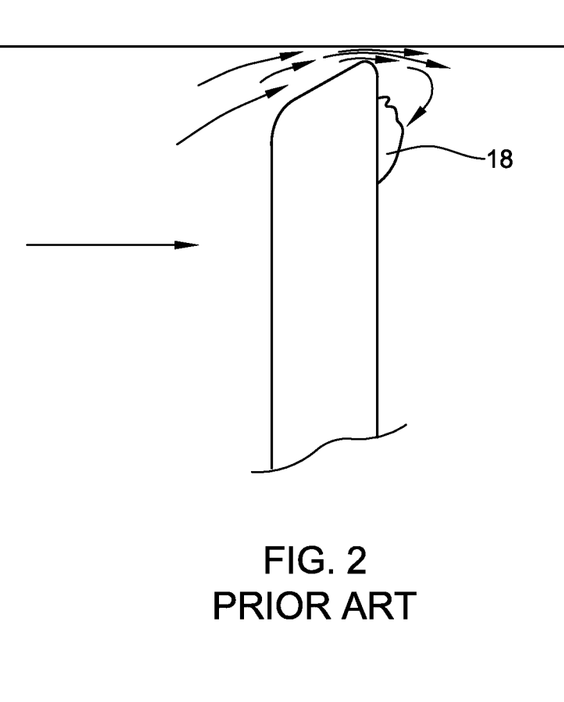

Both types of valves, throttle and pendulum valves, can be used to control the rate of flow of gases delivered to processed-controlled systems, such as a CVD (chemical vapor deposition) system. The gases that are used in processes performed by processed-controlled systems are many and varied. A number of important industrial chemicals used in such processes exist in the liquid phase at or about normal room temperature and pressure, but transition to the vapor phase under normal atmospheric pressure at elevated temperatures. For many industrial applications, it is preferred to handle these chemicals in the vapor phase while, at the same time, minimizing excessive, unnecessary inputs of thermal energy. Striking this balance, however, presents special problems in the case of throttle and pendulum valves for regulating the flow of these vapor-phase chemicals. Unless all wetted surfaces of the valve are maintained at temperatures above the liquid-vapor transition temperature of the chemical being regulated, there is a danger of condensation on a valve interior surface resulting in possible corrosion of the valve, contamination of the fluid stream, and pooling of liquid adversely affecting valve operation. As shown in FIGS. 1 and 2, gas flow around the valve flow control element of a flapper valve can condense not only on the valve flow control element as shown at 18, but also on the internal passageway wall of the valve body as shown at 20.

As a result the surfaces of valve flow control element and the valve body can become contaminated with condensate, interfering with the operation of the valve, and shortening its life when the valve needs servicing and/or replacement. Valves are often heated, externally, around the body of the valve. A valve designed so that the valve shaft can be directly heated in an effort to keep the flapper warm is also available. Similarly, over rotation of the flapper in order to wipe the flapper body clean of contaminates is also known.

In the case of the flapper valve, installing a heater in the valve for heating the flapper above the temperature required to keep the process gas flowing through the valve in its gas phase does not always solve the problem. It is expensive, requires power and at times can not completely protect the flapper due to cooling of the flapper by gas flow. There are also cases where the contamination occurs downstream of the leading edge of the flapper due to the fluid dynamics of the gas flow (large pressure drops and potential cooling). An over-rotation method does not necessarily protect all the critical flapper surfaces from contamination.

In the case of both types of valves, it is important to design the valves so that the closed conductance of the valve is at a minimum so as to minimize leakage through the valve. As will be more evident hereinafter, a control gap between the valve flow control element and the valve body results in a relatively large conductance when the valve body is in the fully closed position. Common methods of reducing closed conductance are: creating a small gap (or extending the length of the gap) by a number of mechanical methods including use of soft sealing materials to close the gap. However, creating small gaps by whatever means usually results in more expensive components and mechanisms, with the small gap being susceptible to contamination. If the control gap is filled with a seal of some sort, then wear (which requires periodic replacement), particle generation and poor motion control (due to friction and hysteresis) often result. It is desirable to control and reduce the closed conductance of a control valve without the use of mechanical parts to do so. Further, it is desirable to reduce contamination of a valve flow control element thereby extending the life of the valve before servicing is required.

BACKGROUND REFERENCES

U.S. Pat. Nos. 5,485,542; 5,564,679; 6,089,537; 6,439,255; 6,776,394 assigned to the present assignee and incorporated herein by reference; and U.S. Pat. Nos. 5,462,080; 5,827,370 and 6,090,206; and U.S. Pub. Patent Application No. 2002/0185067.

SUMMARY OF THE DISCLOSURE

In accordance with one aspect of the disclosed technology, a valve assembly comprises a valve body including a passageway through which a first gas can be transmitted through the valve assembly. A valve flow control element is movable relative to the valve body between an opened position wherein flow through the passageway is at a maximum flow, and a closed position wherein flow through the passageway is at a minimum flow. The valve flow control element is shaped so that a control gap is provided between the valve body and valve flow control element through which the first gas can flow. The dimensions of the control gap vary depending on the position of the valve flow control element relative to the valve body. A gas injector arrangement is provided for selectively injecting a second gas into the control gap when the valve assembly is used to control the flow of the first gas through the passageway.

In accordance with a second aspect of the subject technology, a method of in situ cleaning a valve assembly including a valve body and valve flow control element used to control the flow of a first gas through the valve assembly, comprises: selectively injecting a second gas into a control gap between the valve body and valve flow control element through which the first gas can flow when the valve assembly is used to control the flow of the first gas through the passageway.

DETAILED DESCRIPTION OF THE DRAWINGS

Figure 3:
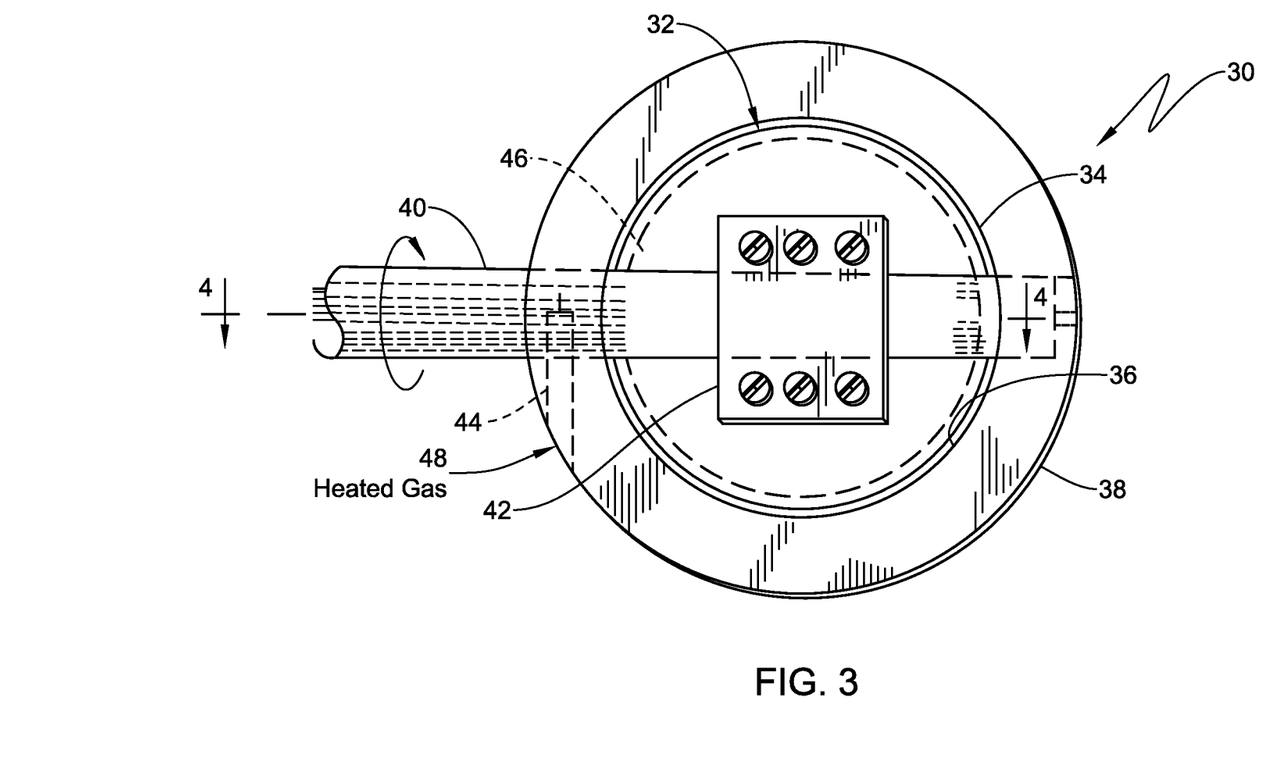
FIG. 3 is a top elevation view of one implementation of a flapper valve incorporating the subject technology wherein the valve is in the fully closed position.
Figure 4:
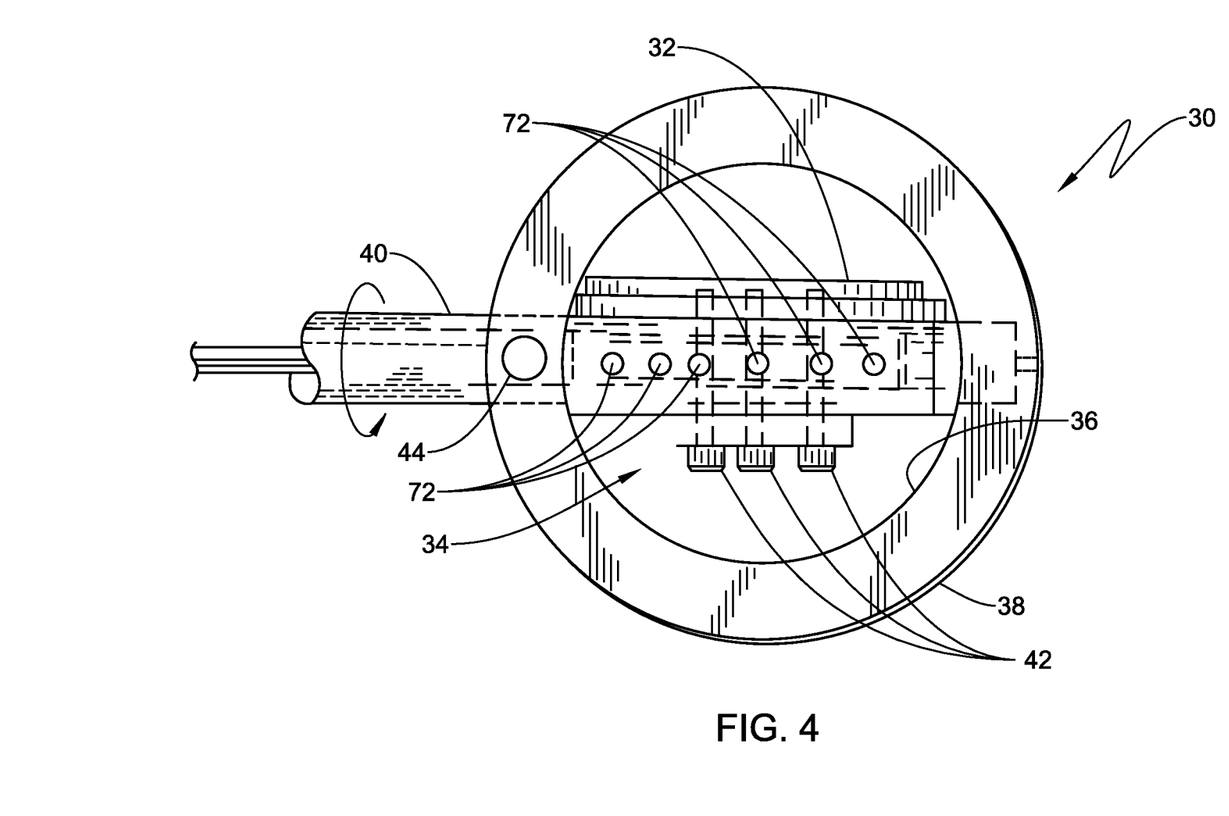
FIG. 4 is a top elevation view of the flapper valve implementation of FIG. 3, wherein the valve is in the fully opened position.

In FIGS. 3 and 4, the illustrated flapper valve, generally identified by numeral 30, is respectively shown in the closed and opened positions. Flapper 32 is disposed in a fluid passageway 34 defined by a sidewall 36 of a valve housing 38. The flapper is mounted on a rotatable shaft 40 by a suitable fastener arrangement 42. Flapper 32, housing 38 including sidewall 36, rotatable shaft 40, and fastener arrangement 42 comprise one or more materials preferably (although not necessarily) (a) having a relatively high degree of thermal conductivity, and (b) in the form of a corrosion-resistant metal or metallic alloy such as stainless steel. Valve housing 38 further comprises at least one gas conduit 44 provided with an inlet 48. The flapper is internally constructed, so that a heated gas can be introduced at inlet 48 that flows to through a gas conduit into the interior of the flapper 32. As shown the conduit 44 can extend through the valve housing 38 directly to the interior 46 of the flapper. Other arrangements can be provided such as providing the inlet at the end of the shaft 40, with the conduit coupled through the shaft 40 directly to the interior of the flapper 32.

Figure 5:
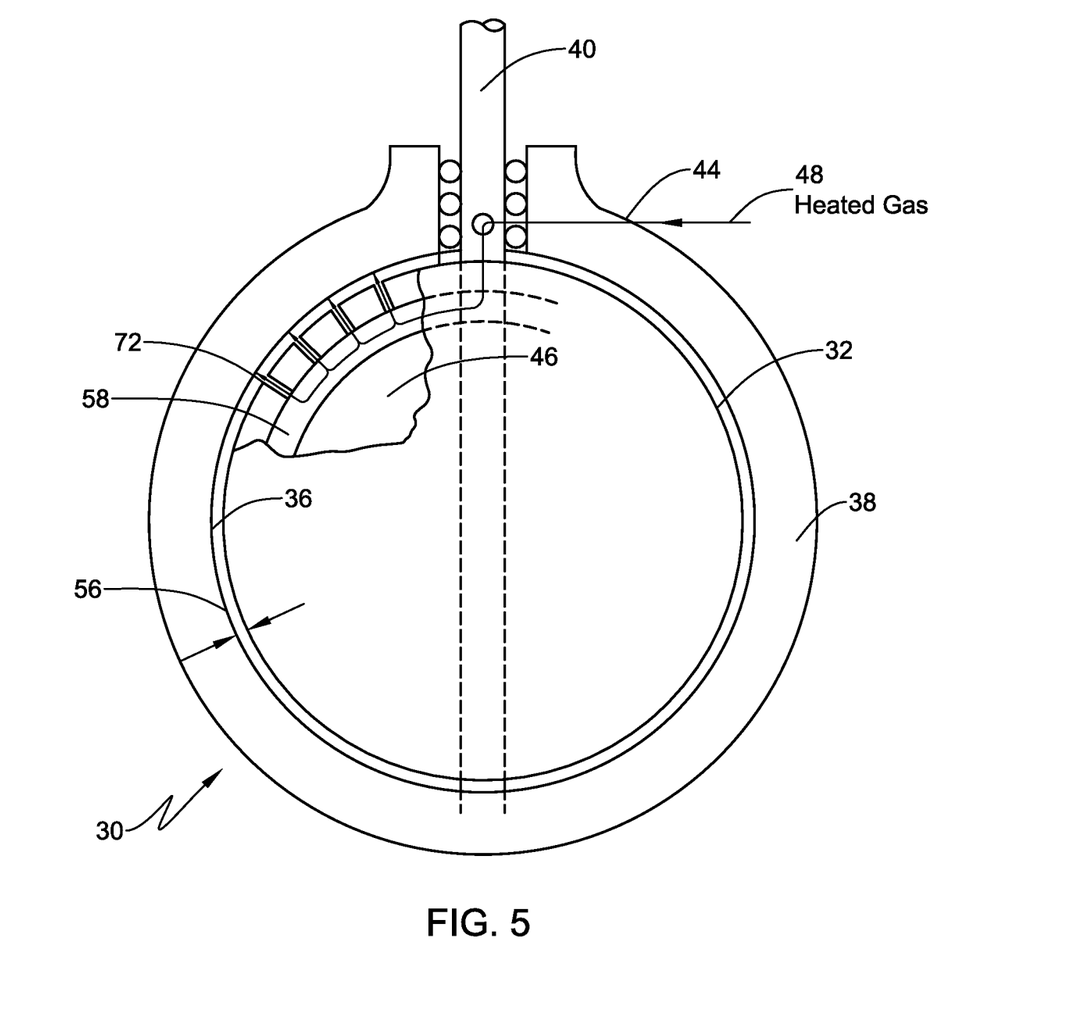
FIG. 5 is a top elevation view of the flapper valve implementation of FIG. 3, with the flapper partially cut-away.
Figure 6:
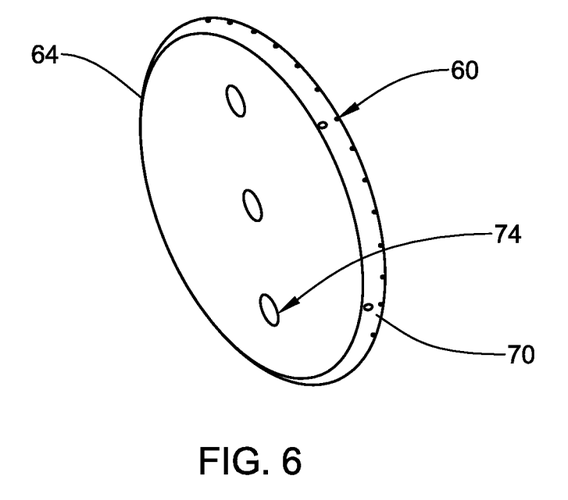
FIGS. 6-8 are perspective views of components of the flapper of the FIG. 3 implementation.
Figure 7:
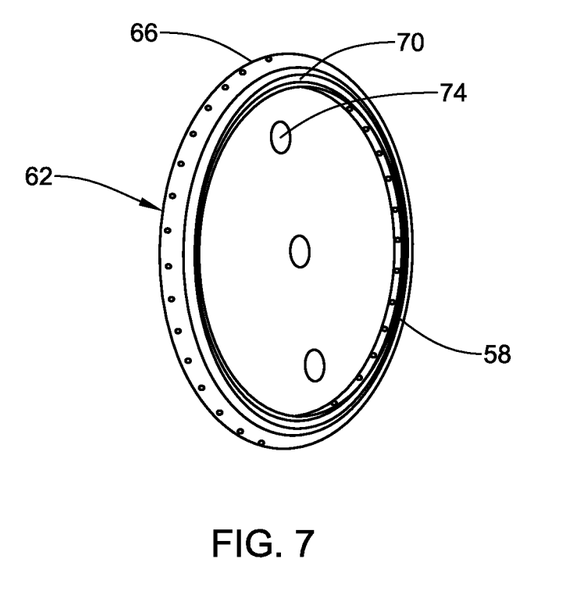
Figure 8:
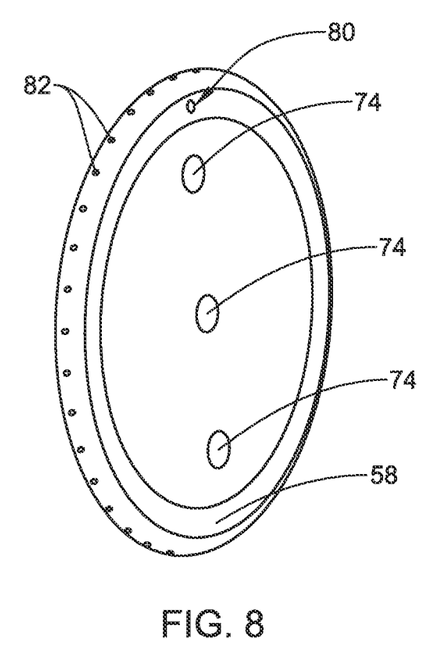

In the illustrated embodiment shown in FIGS. 5-8, interior 46 of the flapper 32 is provided with a suitable structure for directing the flow of heated gas introduced at inlet 48 to apertures provided at or near the outer periphery of the flapper. As best shown in FIGS. 6 and 7, illustrated flapper 32 can be formed to include two relatively flat circular plates 60 and 62 that fit together to form a hollow interior. Each plate respectively is constructed with an outer perimeter rim 64, 66, with each rim being provided with radially-directed holes 70 that align with one another when the two plates are fitted together to form the radially-directed openings 72, as best seen in FIGS. 4 and 5. The plates and holes can be constructed so that once the plates are assembled, the position of the openings 72 can be centered with respect to the flapper width (positioned to lie in a center plane passing between and parallel to and equally spaced from the plates forming the front and back of the flapper). Alternatively, some or all of the holes 70 can be positioned on one or the other side of the center plane, depending on the desired gas flow dynamics of the assembled valve. The flapper plates can also include mounting holes 74 (three being shown in each of plates 62 and 64 in FIGS. 4 and 5).

An additional structure can be provided for further directing flow of heated gas within interior 46 of the flapper to openings 72. The structure can be a manifold (such as shown at 58 in FIGS. 5 and 8) shaped, for example as a toroid, around the internal perimeter of interior 46 of flapper 32. The manifold is designed to fit inbetween plates 62 and 64. Manifold 58 may be formed with one of the plates before the plates are assembled, as an individual part positioned and supported between the plates when they are assembled, or it may be secured to additional support structure, such as a plate (for example, as shown at 58 in FIG. 8), and secured between the two plates 62 and 64. The manifold includes one or more passageways or gas distribution flow channels for providing fluid connection between the interior 46 to the openings 72 of the flapper. The flow channels are arranged so as to provide substantially even flow through the openings 72. In the illustrated example, the toroidal-shaped manifold 58 includes at least one inlet aperture (such as shown at 80 in FIG. 8) in fluid communication with the interior 46 for receiving heated gas being directed from the interior 46 into the flow channels of the manifold. The manifold also includes a plurality of apertures 82 aligned with openings 72 in the flapper when the flapper is assembled. In this way, gas introduced at 48 passes into the interior 46 of the flapper. From the interior the gas flows into the inlet apertures 80 through the gas distribution flow channels of the manifold, through apertures 82 of the manifold, and out the openings 72 of the flapper.

Figure 9:
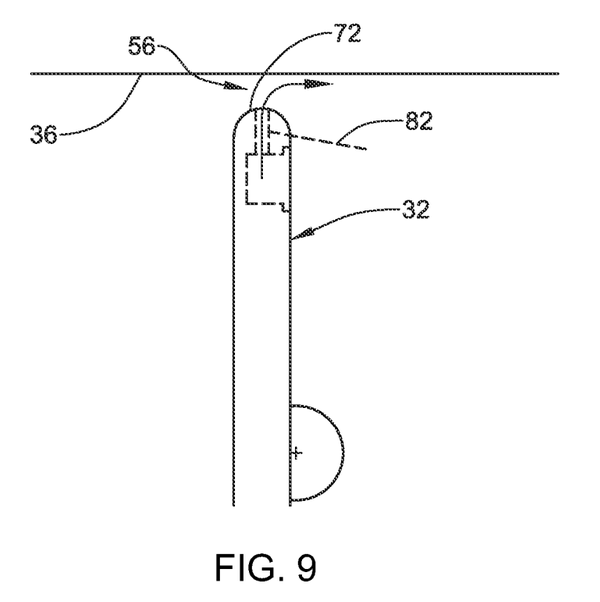
FIG. 9 illustrates a side view, partially cut away, of the flapper as positioned in the valve body of the FIG. 3 implementation.
Figure 10:
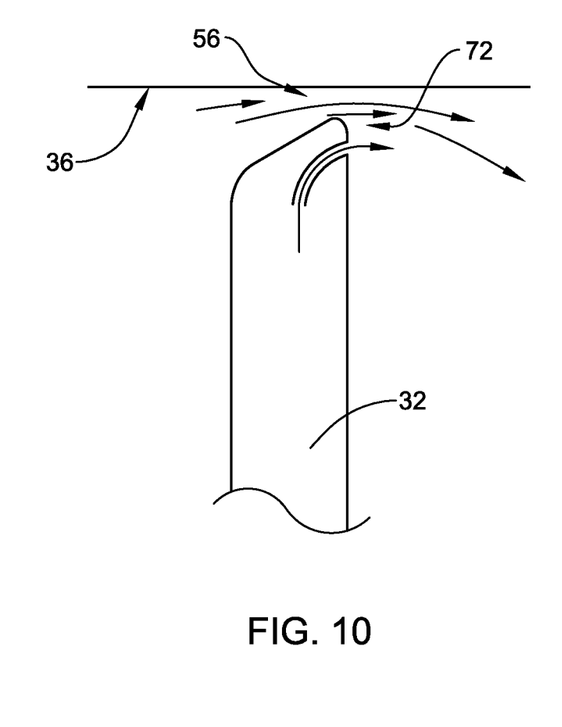
FIGS. 10-13 illustrate side views, cut away, of various examples of the construction of the flapper and the control of flow of a heated gas.
Figure 11:
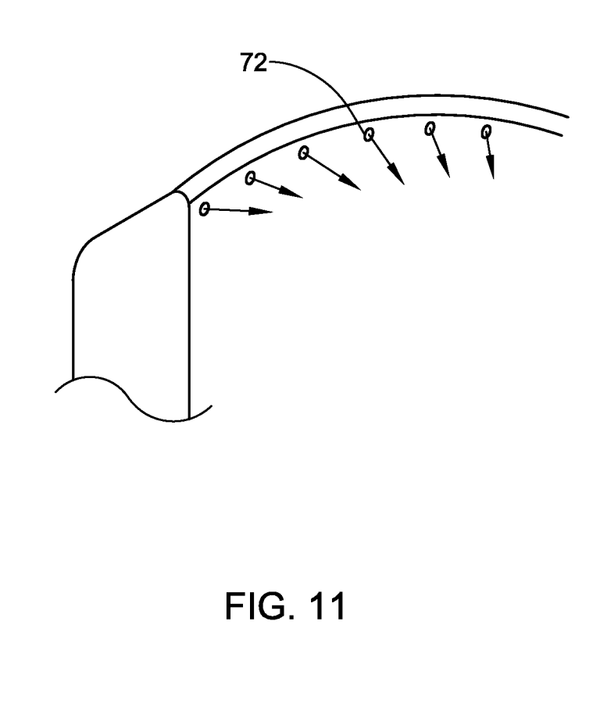

In the embodiment shown, a small control gap 56 (as shown in FIGS. 9 and 10) is provided between the outer periphery of the flapper 32 and sidewall 36 so that heated gas flows out of the openings 72 into control gap 56 (between the outer periphery of the flapper and the inner sidewall 36), even when the valve is completely closed. The dimensions of control gap 56 vary depending on the position of the flapper 32 relative to the sidewall 36. As shown in FIG. 9, instead of a seal, openings 72 provide a gas injector arrangement for selectively injecting a second gas in selected locations around the outer portion of the flapper into the control gap 56 when the valve assembly is used to control the flow of the first gas through the valve. The openings 72 should be radially close to one another to insure that heated gas is substantially evenly provided around the entire periphery of the flapper. As will be evident hereinafter, the second gas flow aids to reduce the closed conductance of the valve.

In a typical operation, the valve is used to control the rate of flow of gases during processes carried out in various processed-controlled systems, such as a CVD system. The gases that are used in these processes are many and varied. A number of important industrial chemicals used exist in the liquid phase at or about normal room temperature and pressure, but transition to the vapor phase under normal atmospheric pressure at elevated temperatures up to about 250° C. For many industrial applications, it is preferred to handle these chemicals in the vapor phase while, at the same time, minimizing excessive, unnecessary inputs of thermal energy. Striking this balance, however, presents special problems in the case of throttle and pendulum valves for regulating the flow of these vapor-phase chemicals. Unless all wetted surfaces of the valve are maintained at temperatures above the liquid-vapor transition temperature of the chemical being regulated, there is a danger of condensation on a valve interior surface resulting in possible corrosion of the valve, contamination of the fluid stream, and pooling of liquid adversely affecting valve operation. In this regard the second gas injected from the flapper must be at a temperature above the temperature at which the controlled gas flowing through valve will condense so that the controlled gas remains in the vapor phase. Usually, this requires the temperature of the second gas to be heated to a temperature above the temperature of the controlled gas to ensure that the controlled gas remains in the vapor phase. In addition, the second gas must be inert so that it will not react with the controlled gas, and will not interfere with the controlled process for which the controlled gas is used.

Construction and general operation of the illustrated heated flapper valve can be better understood by further reference to FIGS. 3, 4, 5 and 9-13. Flapper 32 is shown in the fully "closed" position in FIG. 3, and the fully "open" position in FIG. 4. Flapper 32 is rotated between the two positions by rotating the shaft 40 approximately the 90° between the two positions. In the open position that the center plane of flapper 32 is generally parallel to the longitudinal axis of the passageway 34. Rotating the flapper 32 to the closed position as shown in FIG. 3, results in the holes 72 being adjacent to the surface of sidewall 36, with the control gap 56 therebetween. This allows the heated inert gas to be injected against the sidewall 36 keeping the area clean of any condensate. In general, the heated gas is provided when controlling the flow of a gas through the valve, and thus can function as a shield gas. The controlled gas can be a process gas for example that flows through the valve during a controlled process, but can also be a purge gas used during various deposition processes. Alternatively, the heated gas can be provided between process runs.

It will be apparent from FIGS. 3-8 that thermal energy, produced by heated gas passing through the interior 36 of the flapper, the manifold and out the openings 72 is transferred efficiently by conduction through the flapper 32 and sidewall 36.

The openings 72 can be formed to inject the flow of heated gas in any direction. As shown in FIG. 10, the controlled gas flows around the flapper 32 through the gap 56 formed between the flapper 32 and sidewall 36. In the example shown the openings 72 are formed so as to inject the heated gas in more of a downstream direction so as to be directed to the side wall 36 where condensate is most likely to build up. Alternatively, the openings 72 can be formed so as to inject the heated gas in a more upstream direction, or normal to the sidewall 36.

Figure 12:
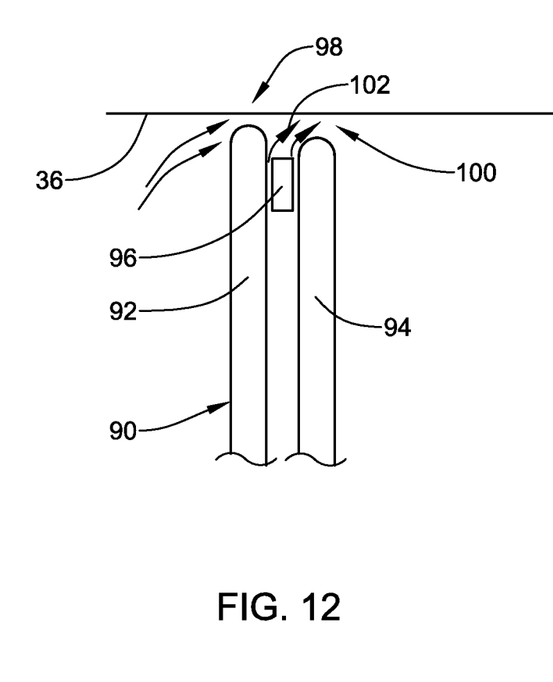

Various modifications can be made to the flapper and still achieve the desired results. For example, as shown in FIG. 12, the flapper can be constructed to three main parts, with the plates of the flapper being of different outer dimensions. As shown, a flapper design of FIG. 12 includes an upstream plate 92 and downstream plate 94 of flapper 90. The upstream plate 92 can be provided with a larger outer diameter than the downstream plate 94. The two plates 92 and 94 are separated by a spacer ring 96 provided with radially-etched channels so as to form the openings 102 through which gas is injected. As a result of the construction the control gap 98 formed between the upstream plate 92 and the sidewall 36 is smaller than the control gap 100 formed between the downstream plate 94 and the sidewall. Such a construction will help reduce the likelihood of shield gas migrating to the process system upstream from the valve.

Figure 13:
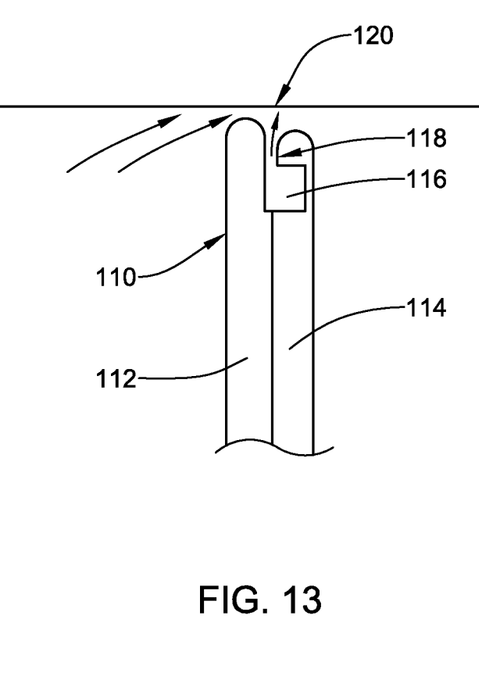

In another example, the flapper 110 can be constructed of two main plates as shown in FIG. 13. As shown, the upstream and downstream plates 112 and 114 fit together without the need for a spacer. In this example, the downstream plate 114 is provide with an annular groove 116 near and around the outer perimeter of the plate so as to form a distribution channel when the two plates are fit together. In this regard the rim 118 of one of the plates can be made thinner so as to create the gas injection holes 120. Again the upstream plate 112 can be provided with an outer diameter that is larger than the outer diameter of the downstream plate 114.

Figure 14:
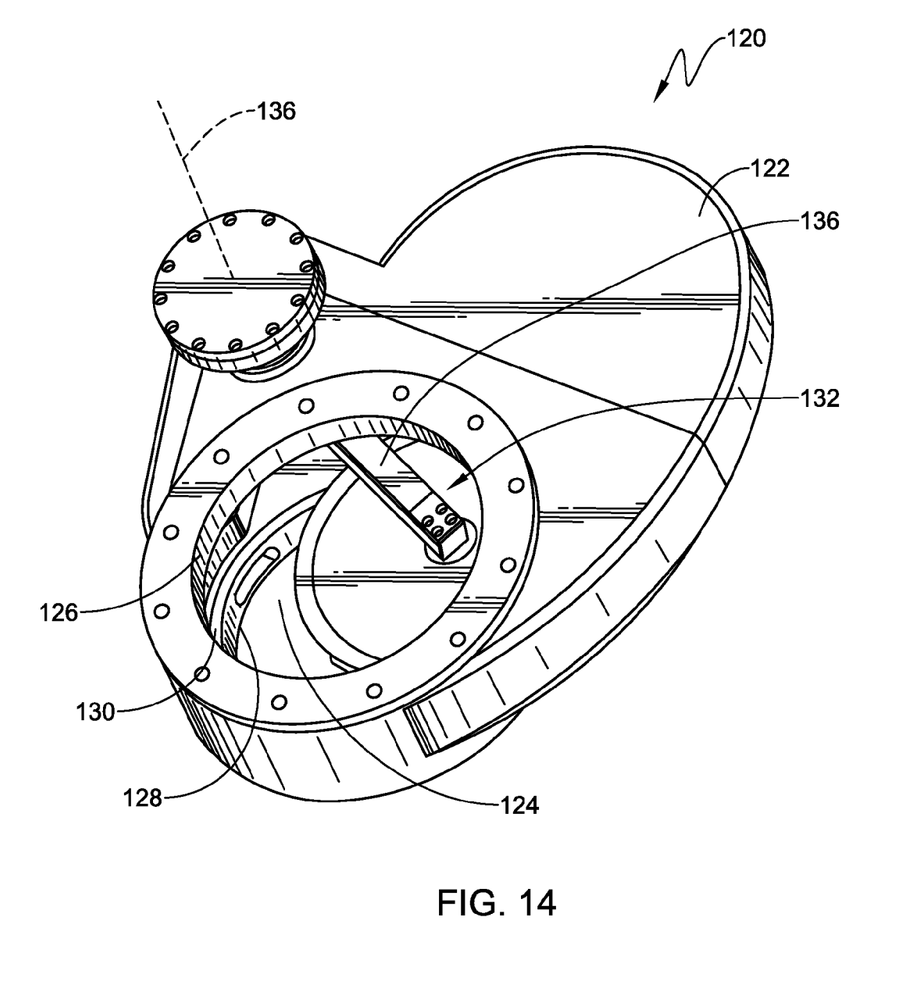
FIG. 14 is a perspective view of one implementation of a pendulum valve incorporating the subject technology, with the valve flow control element in a position between the fully opened and the fully closed position.
Figure 15:
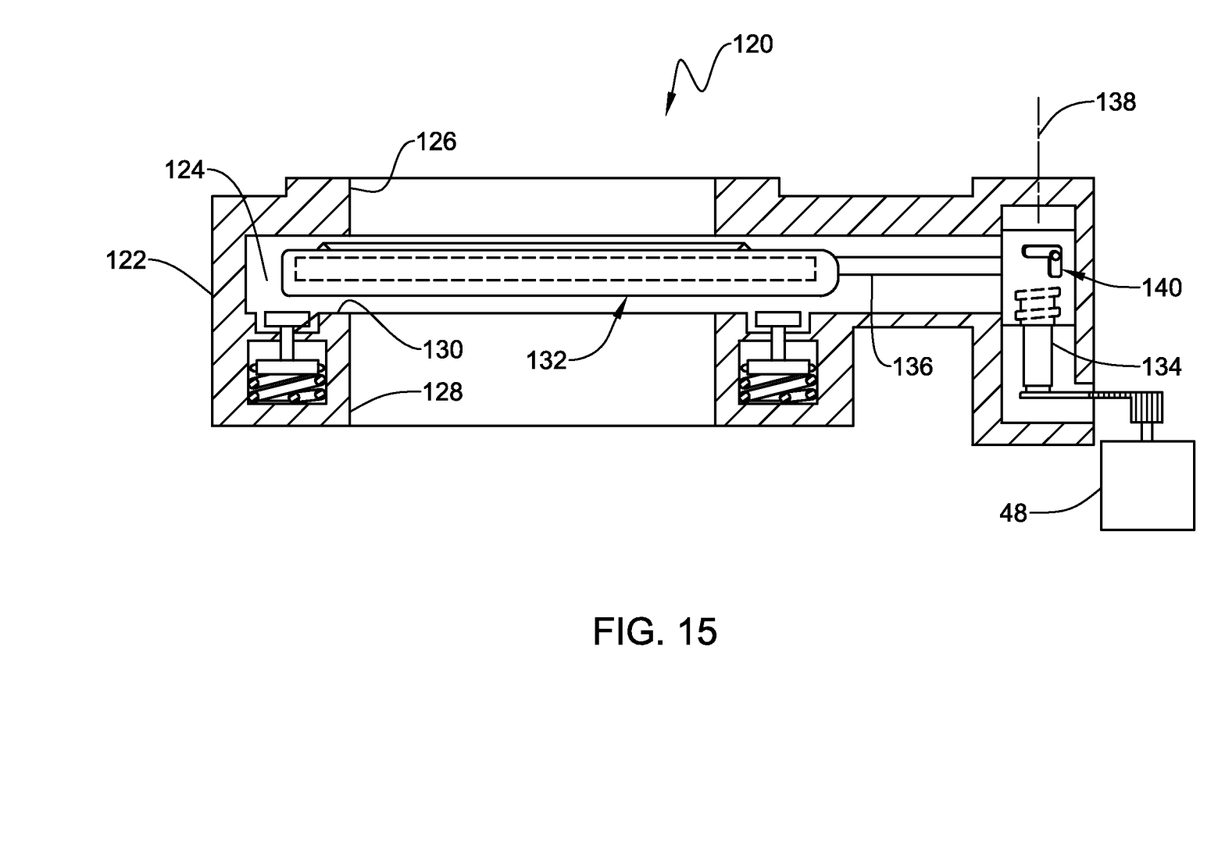
FIG. 15 is a cross sectional side view of the pendulum valve illustrated in FIG. 14.

While the foregoing improvements have been described with respect to a flapper valve, it should be evident that the improvements can be applied to other types of valves. For example, referring to FIGS. 14-16, the principles described herein are applied to a pendulum or gate valve.

In the illustrated example, the pendulum or gate valve assembly 120 comprises a housing 122 including an interior space 124 and a pair of openings 126 and 128 through which fluid can enter and exit the interior space 124. A valve seat 130 is disposed in the interior space around the edge of openings 128. A gate in the form of a disk 132 is mounted relative to the housing 122 so that the disk is movable within the interior space 124 between a completely opened position and a completely closed position. The disk 132 is constructed so that when the disk is moved to the closed position the disk is spaced from the valve seat 130 so as to provide a gap 142 so that heated gas can injected into the gap. A longitudinal shaft (shown at 134 in FIG. 15) defining a longitudinal axis 138, is fixedly coupled to the pivot arm 136 and disk 132 and at least partially mounted within the housing 122. A rotational-translational mechanism 140 (shown in FIG. 15) is provided so that (a) the shaft 134 and disk 132 can rotate about the longitudinal axis 138 between a first angular position where the disk is in a completely opened position and a second angular position where the disk is substantially axially aligned with the opening 128 but spaced from the valve seat 130, and (b) the shaft and disk can move longitudinally, in a direction substantially parallel to the longitudinal axis, so that the disk can move between the second angular position and the closed position as shaft 134 continues to rotate. Rotational-translation mechanism 140 is used to couple the shaft and the housing and arranged so as to control the rotational movement of the shaft and disk between the first angular position and the second angular position and the longitudinal movement and continued rotational movement of the shaft and disk between the second angular position and the closed position (where the disk 132 is spaced from the seat 130 by the control gap 142). See, for example, U.S. Pat. No. 6,089,537, the contents of which are incorporated by reference.

Figure 16:
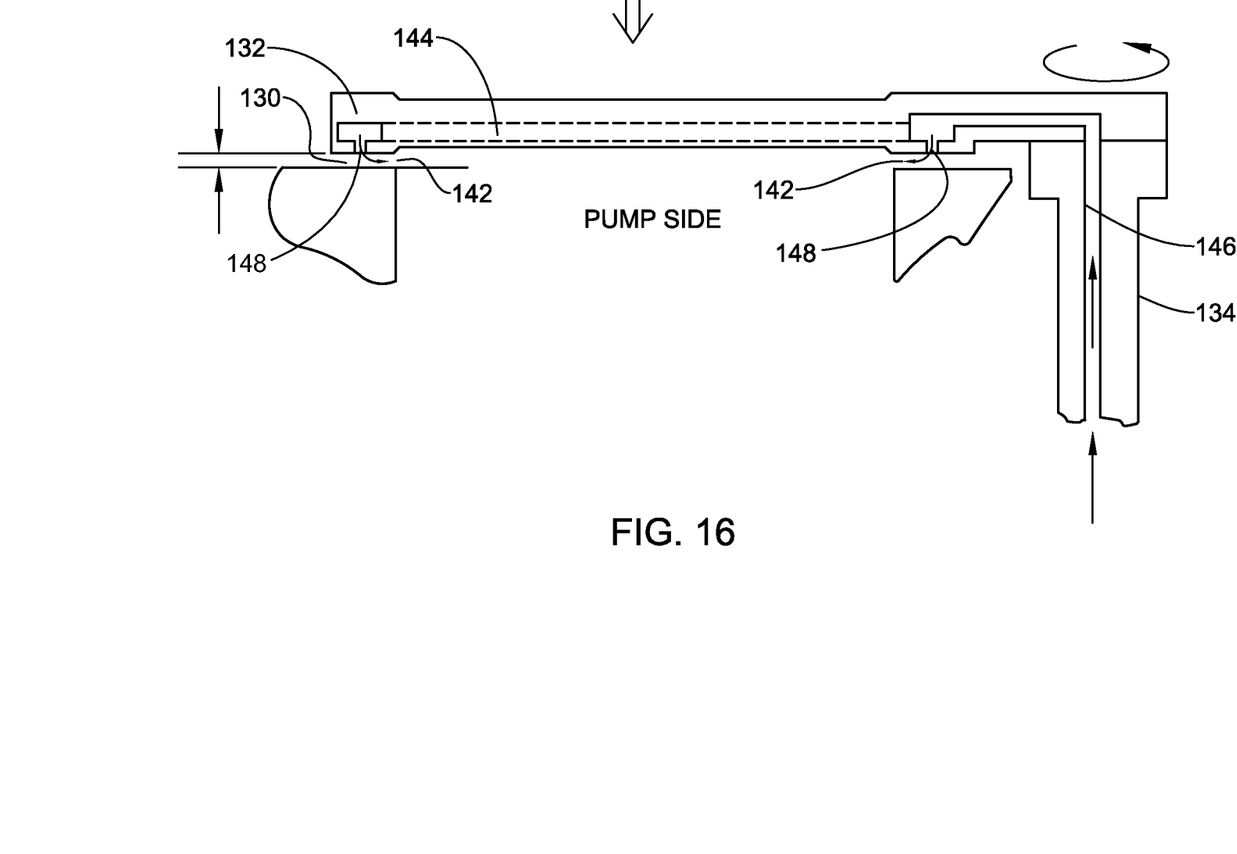
FIG. 16 is a cross sectional side view of portions of the pendulum valve illustrated in FIG. 14.

As shown in FIG. 16, the disk 132 includes an annular gas distribution flow channel 144 around the periphery of the disk 132. The heated gas can be introduced to the inner distribution flow channel 144 through a passageway 146 in the shaft 134 that is in fluid connection with the flow channel. Once in the closed position a shield gas can be injected into the control gap 142. The outer periphery of the disk that does come not contact with the valve seat 130 is provided with openings 148 so that each gas can be injected at the valve seat 130 when the disk is at or near the closed position.

Although especially designed for regulating the flow of liquid-phase substances that are in the vapor state at an elevated temperature, the heated valve assemblies may be adapted for use with both gaseous and liquid fluid flow. The valves may also be made smaller or larger to accommodate different fluid flow rates.

Figure 17:
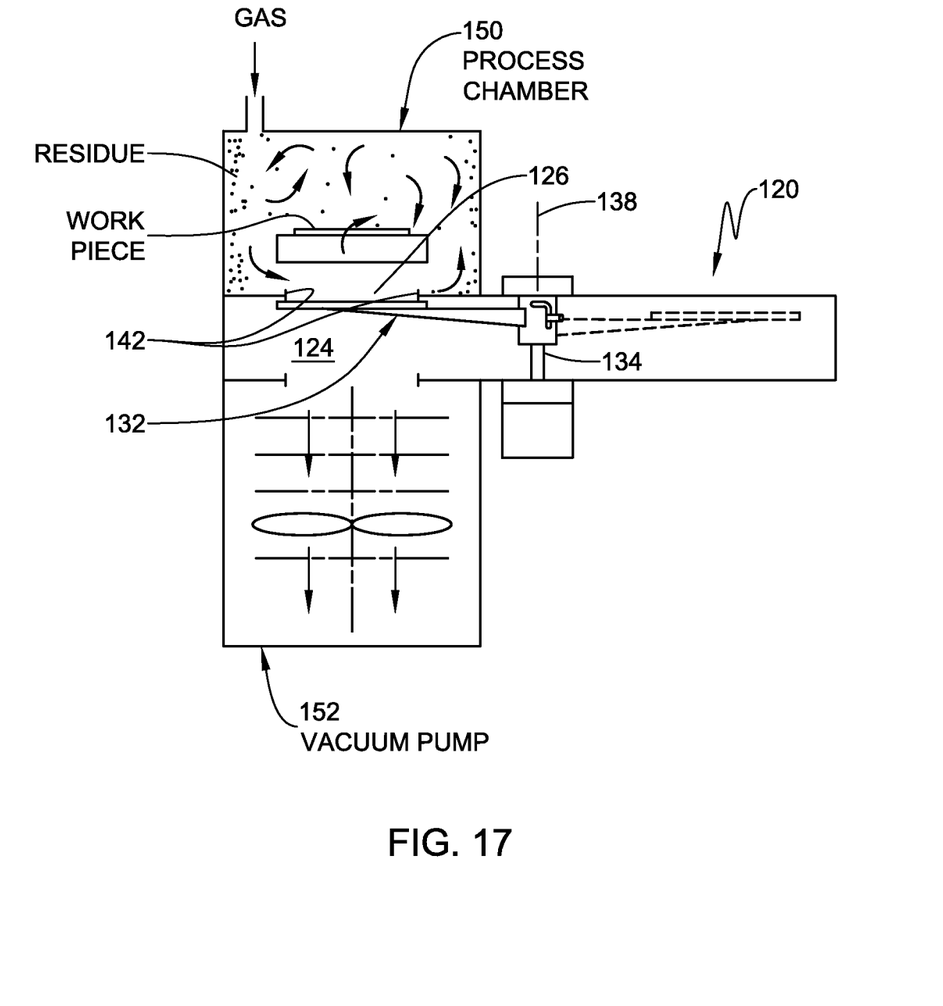
FIG. 17 is a simplified side view of a CVD system utilizing a fluid control valve of the type described herein.

An application of the improved valve assembly is shown in FIG. 17. The illustrated system is a high purity gas delivery system employing a pendulum valve assembly of the type shown and described in connection with FIGS. 13-16. The illustrated pendulum valve assembly 120 of FIG. 17 helps control the flow of gas between the process chamber 150 and the vacuum pump 152 by controlling the position of the disk 132 between the completely opened position and the completely closed position. When in the closed position the disk 132 is spaced from valve seat 130 by the control gap 142 so that a shield gas can be injected into that space.

Thus, providing an injected heated gas when the valve control body is at or near its closed position, reduces contamination of the valve body thereby extending the life of the valve before servicing is required. After a certain level of contamination, the flow characteristics are affected (resulting in non-repeatable process parameters) and eventually, the valve flow control element can not be positioned properly, requiring valve serving and cleaning. The cleaning approach is simple and relatively low in cost. Heaters are not be required to be provided in the valve assemblies. Large motor torque is not required to clean the valve flow control element and the valve body thereby reducing cost. If heating is required it would be delivered (by the heated gas) to the flow area required.

In addition, the introduction of an injected gas flow in the conductance controlling gap (both in the flapper and pendulum valves) provides a technique for controlling and reducing the closed conductance of a valve without the use of additional mechanical and or electrical devices, such as seals and electrical heaters. The injected heated gas adds to the process gas flow, increasing the overall mass flow in the control gap. This increased mass flow creates a greater delta P (differential pressure) across the control gap thereby presenting an apparent lower closed conductance to the process chamber. Where the valve assembly is used in the exhaust line, since the gas can be introduced in the exhaust line, at the valve, it is estimated that little gas will reach the process chamber (depending on flow regime upstream of the valve). It should be noted that the heated gas need only be provided when the valve is closed or nearly closed. When the valve is opened in order to establish a high conductance (such as when a chamber is pumped down) the gas flow can be turned off.

Since other changes and modifications may be made in the above-described apparatuses and processes without departing from the scope of the invention herein involved, it is intended that all matter contained in the above-description shall be interpreted in an illustrative and not in a limiting sense.

What is claimed is:

1. A valve assembly comprising:
a valve body including a passageway through which a first gas can be transmitted through the valve assembly;
a valve flow control element movable relative to the valve body between an opened position wherein flow through the passageway is at a maximum flow, and a closed position wherein flow through the passageway is at a minimum flow, the valve flow control element is shaped so that a control gap is provided between the valve body and valve flow control element through which the first gas can flow, and the dimensions of the control gap vary depending on the position of the valve flow control element relative to the valve body; and
a gas injector arrangement for selectively injecting a second gas into the control gap when the valve assembly is used to control the flow of the first gas through the passageway, wherein the valve assembly has a valve conductance depending on the position of the valve flow control element relative to the valve body, and the gas injector arrangement injects the second gas into the control gap so as reduce the valve conductance of the valve when the valve flow control element is at or near the closed position, wherein gas injector arrangement includes secondary passageways within the valve flow control element for directing the second gas to the control gap.

2. A valve assembly according to claim 1, wherein the valve assembly is a butterfly valve and the valve flow control element is a movable flapper.

3. A valve assembly according to claim 1, wherein the valve assembly is a pendulum valve, and the valve flow control element is a movable disk.

4. A valve assembly according to claim 1, wherein the valve flow control element includes at least two plates configured and arranged so as to define at least portions of the secondary passageways of the injector arrangement.

5. A valve assembly according to claim 4, further including a spacer disposed between the two plates.

6. A valve assembly according to claim 1, wherein the arrangement include apertures in the valve flow control element for directing the second gas into the control gap.

7. A valve assembly according to claim 6, wherein the apertures in the valve flow control element are arranged so as to direct the second gas in a radially outward direction from the valve flow control element.

8. A valve assembly according to claim 6, wherein the apertures in the valve flow control element are arranged so as to direct the second gas in the same downstream direction as to the flow of the first gas.

9. A valve assembly comprising:
a valve body including a passageway through which a first gas can be transmitted through the valve assembly;
a valve flow control element movable relative to the valve body between an opened position wherein flow through the passageway is at a maximum flow, and a closed position wherein flow through the passageway is at a minimum flow, the valve flow control element is shaped so that a control gap is provided between the valve body and valve flow control element through which the first gas can flow, and the dimensions of the control gap vary depending on the position of the valve flow control element relative to the valve body; and
a gas injector arrangement for selectively injecting a second gas into the control gap when the valve assembly is used to control the flow of the first gas through the passageway, wherein the second gas is at a temperature higher than the first gas so that the first and second gases mix at a temperature above the condensation temperature of the first gas.

10. A method of in situ cleaning a valve assembly including a valve body and valve flow control element used to control the flow of a first gas through the valve assembly, comprising:
selectively injecting a second gas into a control gap between the valve body and valve flow control element through which the first gas can flow when the valve assembly is used to control the flow of the first gas through a passageway in the valve body, wherein the valve assembly has a valve conductance depending on the position of the valve flow control element relative to the valve body, and selectively injecting includes injecting the second gas into the control gap so as reduce the valve conductance of the valve when the valve flow control element is at or near a closed position; and further including transmitting the gas through secondary passageways within the valve flow control element so as to direct the second gas to the control gap.

11. A method according to claim 10, wherein the second gas is a gas that is nonreactive with the first gas.

12. A method according to claim 10, wherein the valve assembly is a butterfly valve and the valve flow control element is a movable flapper.

13. A method according to claim 10, wherein the valve assembly is a pendulum valve.

14. A method according to claim 10, wherein the valve flow control element includes at least two plates configured and arranged so as to define at least portions of the secondary passageways.

15. A method according to claim 14, further including disposing a spacer between the two plates.

16. A method according to claim 14, wherein injecting the second gas into the control gap includes directing the second gas through apertures in the valve flow control element into the control gap.

17. A method according to claim 16, wherein injecting the second gas includes directing the second gas through the apertures in a radially outward direction from the valve flow control element.

18. A method according to claim 16, wherein injecting the second gas includes directing the second gas through the apertures in the same downstream direction as to the flow of the first gas.

19. A method of in situ cleaning a valve assembly including a valve body and valve flow control element used to control the flow of a first gas through the valve assembly, comprising:
selectively injecting a second gas into a control gap between the valve body and valve flow control element through which the first gas can flow when the valve assembly is used to control the flow of the first gas through a passageway in the valve body, wherein the second gas is at a temperature higher than the first gas so that the first and second gases mix at a temperature above the condensation temperature of the first gas.

* * * * *